United States Patent
Vasseur et al.

(10) Patent No.: US 8,077,713 B2
(45) Date of Patent: Dec. 13, 2011

(54) DYNAMIC UPDATE OF A MULTICAST TREE

(75) Inventors: Jean-Philippe Marcel Vasseur, Dunstable, MA (US); Stefano Novello, Prague (CZ); Stefano Benedetto Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 548 days.

(21) Appl. No.: 11/853,610

(22) Filed: Sep. 11, 2007

(65) Prior Publication Data
US 2009/0067348 A1    Mar. 12, 2009

(51) Int. Cl.
*H04L 12/28*    (2006.01)
*H04J 3/26*    (2006.01)

(52) U.S. Cl. .......................... 370/390; 370/408; 370/432

(58) Field of Classification Search .................. None
See application file for complete search history.

(56) References Cited

U.S. PATENT DOCUMENTS

| | | | |
|---|---|---|---|
| 6,611,872 B1* | 8/2003 | McCanne | 709/238 |
| 6,728,777 B1* | 4/2004 | Lee et al. | 709/238 |
| 2003/0204587 A1* | 10/2003 | Billhartz | 709/224 |
| 2004/0170188 A1* | 9/2004 | Paila et al. | 370/432 |
| 2006/0193332 A1* | 8/2006 | Qian et al. | 370/397 |
| 2007/0177594 A1* | 8/2007 | Kompella | 370/390 |
| 2008/0219272 A1 | 9/2008 | Novello et al. | |
| 2008/0298294 A1* | 12/2008 | Gonsa et al. | 370/312 |

* cited by examiner

*Primary Examiner* — Gregory Sefcheck
*Assistant Examiner* — Jenkey Van
(74) *Attorney, Agent, or Firm* — Schwegman, Lundberg & Woessner, P.A.

(57) ABSTRACT

In an example embodiment, a multicast tree is accessed. The multicast tree defines one or more destination label switch routers and paths from a source label switch router to the destination label switch routers. Multicast addresses are then transmitted to the destination label switch routers. In an example embodiment, upon receipt of the multicast addresses, a request to update the multicast tree is transmitted. The request includes the identifier of the label switch router that originated the request.

11 Claims, 14 Drawing Sheets

DYNAMIC UPDATE OF A MULTICAST TREE

FIELD

The present disclosure relates generally to computer networks. In an example embodiment, the disclosure relates to the update of a multicast tree.

BACKGROUND

For nodes in a computer network to receive a particular data stream, a network administrator can setup a point-to-multipoint traffic engineering (P2MP TE) label switch paths between a source label switch router and a common group of destination label switch routers. The source label switch router may broadcast or transmit the particular data stream to all the destination label switch routers by way of the P2MP TE label switch paths.

The setup of such P2MP TE label switch paths requires each source label switch router to be aware of all destination label switch routers within the group. Such groups commonly include a significant number of destination label switch routers, and there may also be a potentially large number of source label switch routers. The large number of label switch routers requires a network administrator to manually configure all destination label switch routers on each source label switch router. Such manual configuration is cumbersome and prone to misconfiguration.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

The embodiments described herein provide methods and apparatuses for updating a multicast tree. In an example embodiment, a multicast tree is accessed. The multicast tree defines one or more destination label switch routers and paths from a source label switch router to the destination label switch routers. Multicast addresses are then transmitted to the destination label switch routers. In an example embodiment, upon receipt of the multicast addresses, a request to update the multicast tree is transmitted. The request includes the identifier of the label switch router that originated the request.

Example Embodiments

Figure 1:
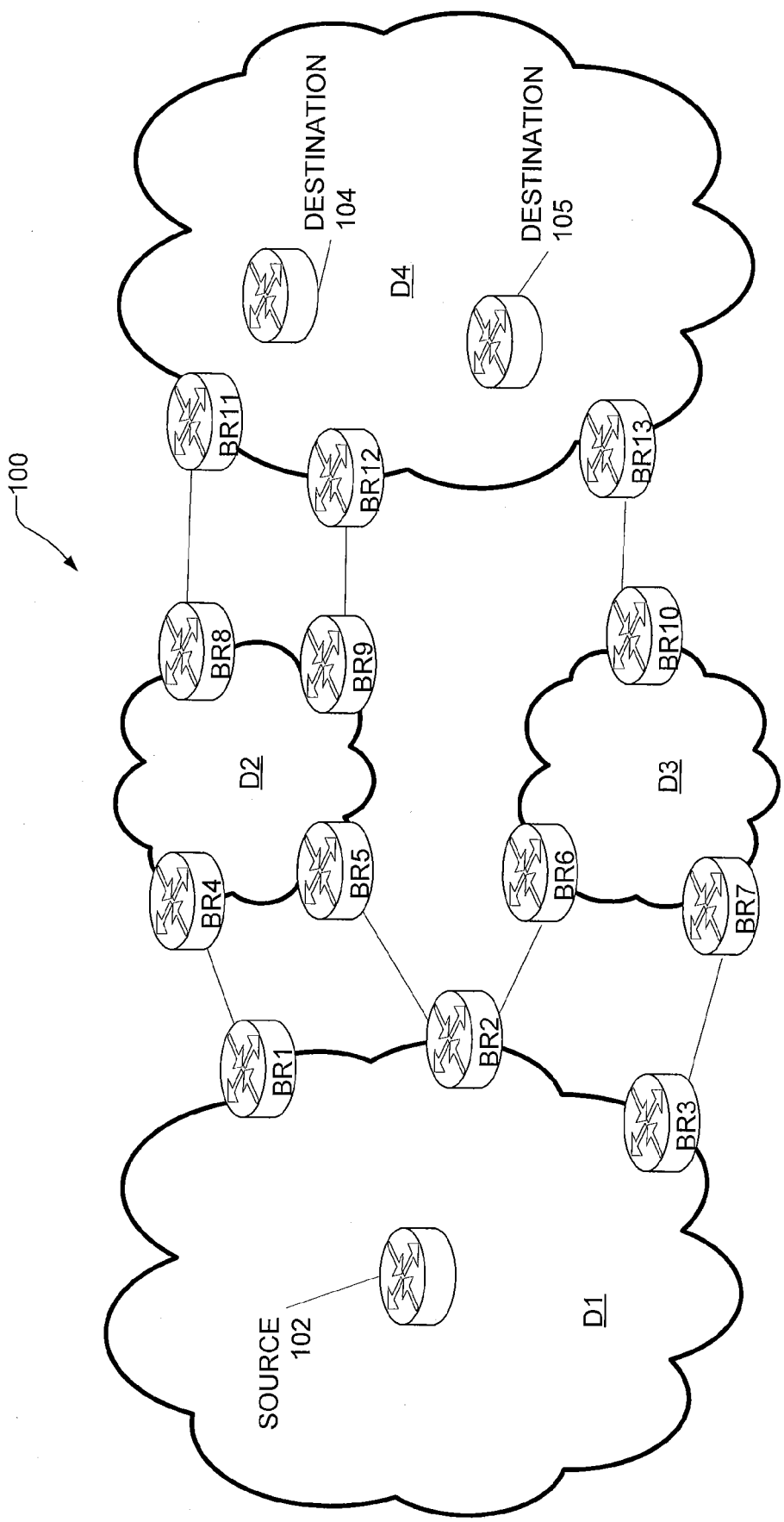
FIG. 1 is a simplified diagram of an example computer network.

FIG. 1 is a simplified diagram of an example computer network. Computer network 100 may include multiple domains D1-D4 interconnected by border routers BR1-BR13 and intra-domain links. Generally, computer network 100 is a geographically distributed collection of nodes interconnected by communication links and segments for transporting data between end nodes, such as personal computers and workstations. Computer network 100 may be further interconnected by one or more intermediate network nodes, such as routers BR1-BR13, 102, 104, and 105. Examples of computer networks, such as computer network 100, include local area networks and wide area networks. A local area network connects the nodes over dedicated private communications links located in the same general physical location, such as a building or campus. A wide area network, on the other hand, connects geographically dispersed nodes over long-distance communications links, such as common carrier telephone lines, optical light paths, synchronous optical networks (SONET), or synchronous digital hierarchy (SDH) links. The Internet is an example of a wide area network that connects disparate networks throughout the world, providing global communication between nodes on various networks. The nodes communicate over computer network 100 by exchanging discrete frames or packets of data according to predefined protocols, such as Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, interior gateway protocol (IGP), and other protocols.

Groups of computer networks may be maintained as routing domains D1-D4. A domain, such as domain D1, D2, D3 or D4, is a collection of nodes (e.g., routers) under the control of one or more entities that present a common routing policy. Domain D1, D2 or D4 may also be referred to as an autonomous system. The networks within domains D1-D4 can be coupled together by intra-domain routers BR1-BR13 that are configured to execute intra-domain routing protocols and are generally subject to a common authority. A label switch router (LSR) is an example of an intra-domain router. A label switch router is a type of a router located in the middle of a Multiprotocol Label Switching (MPLS) network, described in more detail below, which is responsible for switching the labels used to route packets. It should be appreciated that a label is a short, fixed length, locally significant identifier used to identify a forwarding equivalence class.

To improve routing scalability, a service provider (e.g., an Internet service provider) may divide domain D1, D2, D3 or D4 into multiple areas or levels. To increase the number of nodes capable of exchanging data, intra-domain routers, such as border routers BR1-BR13, executing intra-domain routing protocols may be used to interconnect nodes of various domains D1-D4. Intra-domain routers that interconnect different domains D1-D4 are border routers BR1-BR13. Nodes within domains D1-D4 may be present that may interconnect to border routers BR1-BR13 of each of the domains. For example, as shown in FIG. 1, source label switch router 102 (a node) in domain D1 may be interconnected by one or more paths, each of which may comprise one or more particular links/nodes not shown for ease of discussion to border routers BR1-BR3. It should be noted that a number of nodes, routers, links, etc. may be used in computer network 100, and that the computer network of FIG. 1 shown herein is for simplicity. Further, computer network 100 is described in relation to multiple domains D1-D4, and the computer network may apply to a variety of other intra-domain network configurations, such as inter-AS, intra-area, intra-level, and other network configurations.

Figure 2:
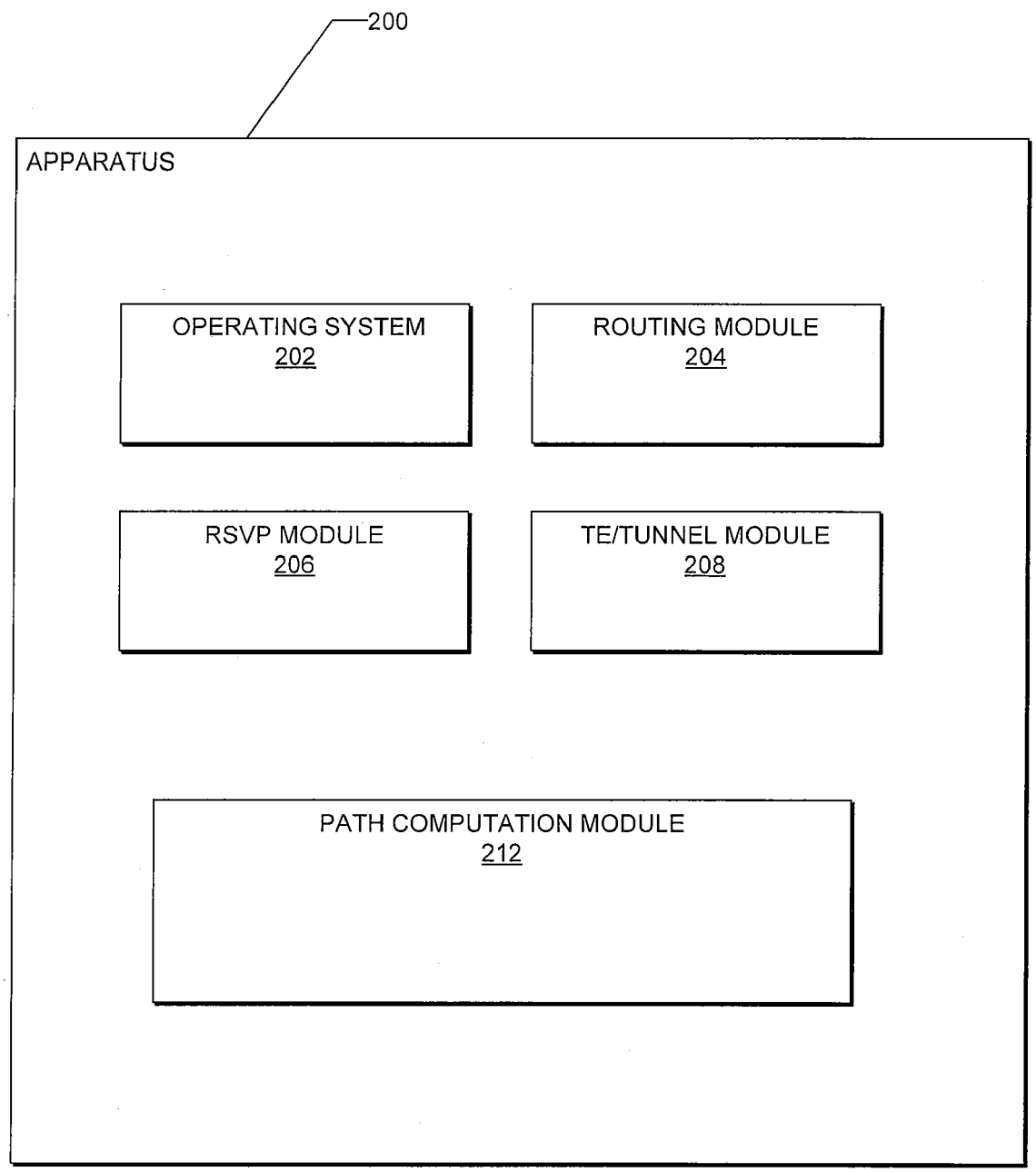
FIG. 2 is a simplified block diagram of modules included in an apparatus, in accordance with an example embodiment.

FIG. 2 is a simplified block diagram of modules included in an apparatus, in accordance with an example embodiment. Apparatus 200 includes operating system 202 (e.g., an Internetworking Operating System) that manages the software processes and/or services executing on the apparatus. As shown in FIG. 2, these software processes and/or services may include routing module 204, Resource ReSerVation Protocol (RSVP) module 206, Traffic Engineering (TE)/Tunnel module 208, and path computation module 212. It should be appreciated that apparatus 200 may be deployed in the form of a variety of network devices that receives data for communication to other network devices, such as routers, switches or the like. For example, apparatus 200 may form a part of one of the network devices depicted in FIG. 1, such as routers BR1-BR13, 102, 104, and 105. In various example embodiments, apparatus 200 may be used to implement computer programs, logic, applications, methods, processes, or other software to add and/or delete label switch routers from a multicast tree, as described in more detail below.

Referring to FIG. 2, routing module 204 performs functions provided by one or more routing protocols. Examples of routing protocols include IGP, Border Gateway Protocol (BGP), and other routing protocols. These functions may include the management of routing and the forwarding of information databases containing, for example, data used to make routing and forwarding decisions. Routing module 204 may also perform functions related to virtual routing protocols, such as maintaining virtual routing and forwarding instances.

Traffic Engineering (TE)/tunnel module 208 implements traffic engineering and tunnel functions. It should be appreciated that Multi-Protocol Label Switching Traffic Engineering (MPLS TE) has been developed to meet data networking requirements such as guaranteed available bandwidth and fast restoration. MPLS TE uses label switching techniques to build end-to-end tunnels based on a series of constraints through an IP/MPLS network of label switch routers. These tunnels may be a type of label switched path (LSP) and thus are generally referred to as MPLS TE-LSPs. Accordingly, as used herein, it should be noted that a tunnel, a label switch path or an MPLS TE-LSP may be referred to as a "path," and such terms may be used interchangeably. Generally, a path is a logical structure that encapsulates a packet of one protocol inside a data field of another protocol packet with a new header. In this manner, the encapsulated data may be transmitted through networks that it would otherwise not be capable of traversing. A path establishes a transparent virtual network link between two network nodes that is generally unaffected by physical network links or devices (e.g., the physical network links or devices merely forward the encapsulated packet based on the new header).

The paths may be signaled through the use of RSVP protocol (with Traffic Engineering extensions), such as RSVP TE signaling messages. RSVP module 206 implements RSVP and processes RSVP messages. In traffic engineering applications, RSVP signaling is used to establish a path and to convey various path attributes to routers, such as border routers, along the path. It should be noted that the use of RSVP serves merely as an example, and that other communication protocols may be used in accordance with the example embodiments described herein.

Path computation module 212 is configured to compute a path from a source label switch router to a destination label switch router, to signal along the path, and/or to modify forwarding tables at intermediate label switch routers along the path. Examples of path computation module 212 include Path Computation Element (PCE) and Path Computation Client (PCC). As explained in more detail below, path computation module 212 may also be configured to update (e.g., add or delete) label switch routers on a multicast tree. It should be appreciated that the computed path may be the shortest path, as measured in some metric (e.g., cost, length, and other metrics) that satisfies relevant LSP Traffic Engineering constraints or attributes. Examples of constraints include bandwidth, affinities (administrative constraints to avoid or include certain links), priority, class type, and other constraints. Path computation can either be performed by a source label switch router or by some other label switch router. The source label switch router can exploit its knowledge of network topology and resources available on each link to perform the path computation according to LSP Traffic Engineering constraints. Various path computation methodologies are available including Constrained Shortest Path First (CPSF), intra-domain point-to-multipoint path (P2MP) computation, and other computation methodologies.

Figure 3:
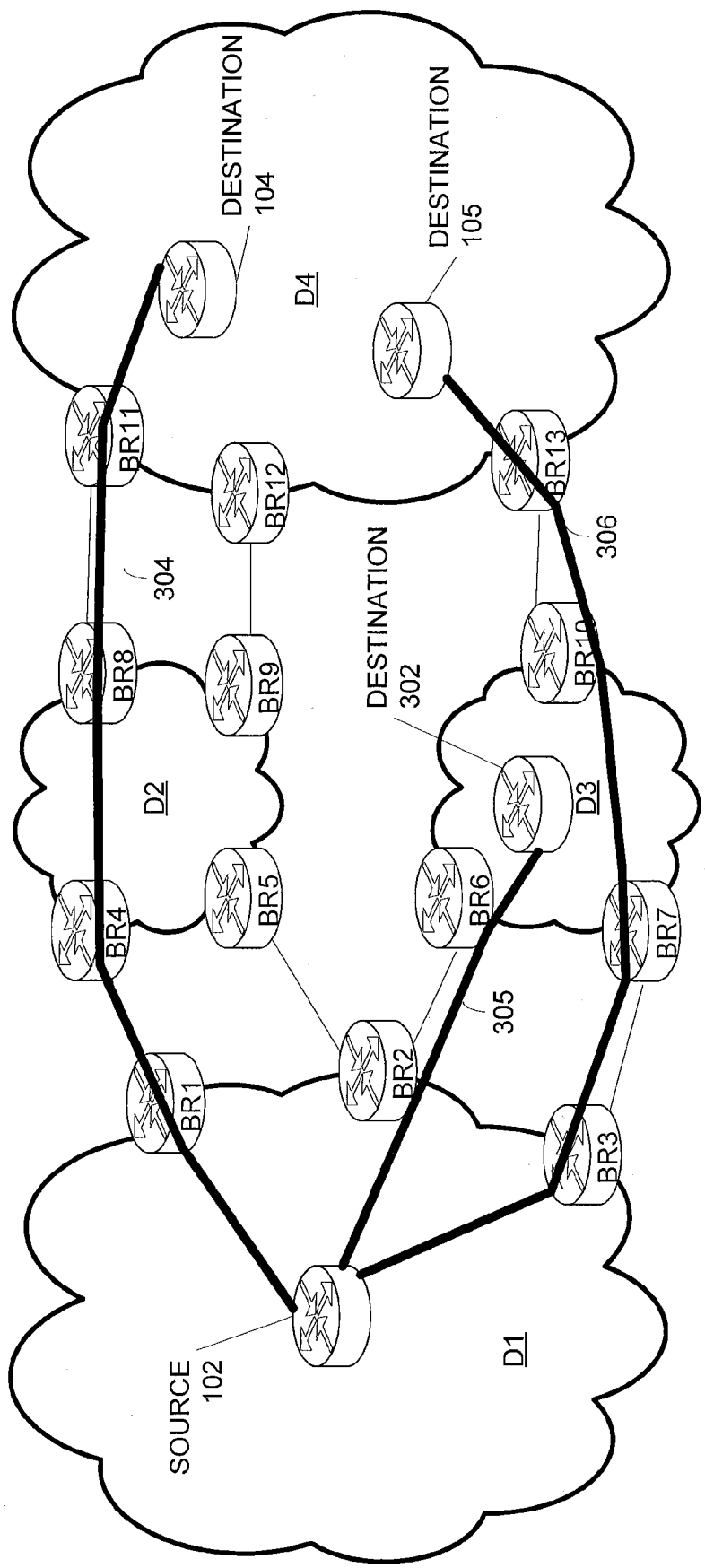
FIG. 3 is a simplified diagram of a multicast data tree, in accordance with an example embodiment.

FIG. 3 is a simplified diagram of a multicast data tree, in accordance with an example embodiment. In general, it should be noted that multicasting is based on the concept of a multicast group. A multicast group is a group of nodes (e.g., label switch routers) that receive a particular data stream. For example, as shown in FIG. 3, label switch routers 102, 104, 105, and 302 associated with domains D1, D3, and D4 may be included in a multicast group. In another example, a multicast group may include label switch routers 102, BR9, BR10, 104 and 105 associated with domains D1-D4.

Multicast routers (e.g., source label switch router 102) create one or more multicast trees that control the path that multicast traffic takes through the network to deliver traffic (e.g., data stream) to nodes within a multicast group. A multicast tree is an ordered set of label switch routers and traffic engineering links that comprise the path from a source label switch router to one or more destination label switch routers. For example, as shown in FIG. 3, a multicast tree may define multiple destination label switch routers 104, 105, and 302 and paths 304-306 from source label switch router 102 to the destination label switch routers. Source label switch router 102 initiates the signaling messages that set up paths 304-306. Source label switch router 102 may also be referred to as a head-end label switch router or an ingress label switch router. Destination label switch routers 104, 105, and 302 are destinations of paths 304-306. Destination label switch routers 104, 105, and 302 may also be referred to as leaves. Since many multicast trees define one source label switch router, such as source label switch router 102, and multiple destination label switch routers, such as destination label switch routers 104, 105, and 302, a multicast tree may also be referred to as a point-to-multipoint (P2MP) tree.

A multicast tree may include a multicast data tree and a multicast control tree. FIG. 3 shows an example of a multicast data tree. The multicast data tree defines destination label switch routers 104, 105, and 302 and paths 304-306 from source label switch router 102 to the destination label switch routers. In an example embodiment, destination label switch routers 104, 105, and 302 may be predefined. For example, a user may define destination label switch routers 104, 105, and 302. It should be appreciated that destination label switch routers 104, 105, and 302 may be associated with one or more domains, such as domains D3 and D4. For example, destination label switch routers 104 and 105 are associated with domain D4. Destination label switch router 302 is associated with domain D3. FIG. 3 shows the computational result of paths 304-306 from source label switch router 102 to each destination label switch router 104, 105 or 302. Paths 304-306 may traverse domains D1-D4 by way of border routers, such as BR1-BR4, BR6-BR7, BR8, BR10, BR11, and BR13, associated with the domains. The multicast data tree may be stored in source label switch router 102 or other label switch routers, such as border routers BR1-BR4, BR6-BR7, BR8, BR10, BR11, and BR13.

Figure 4:
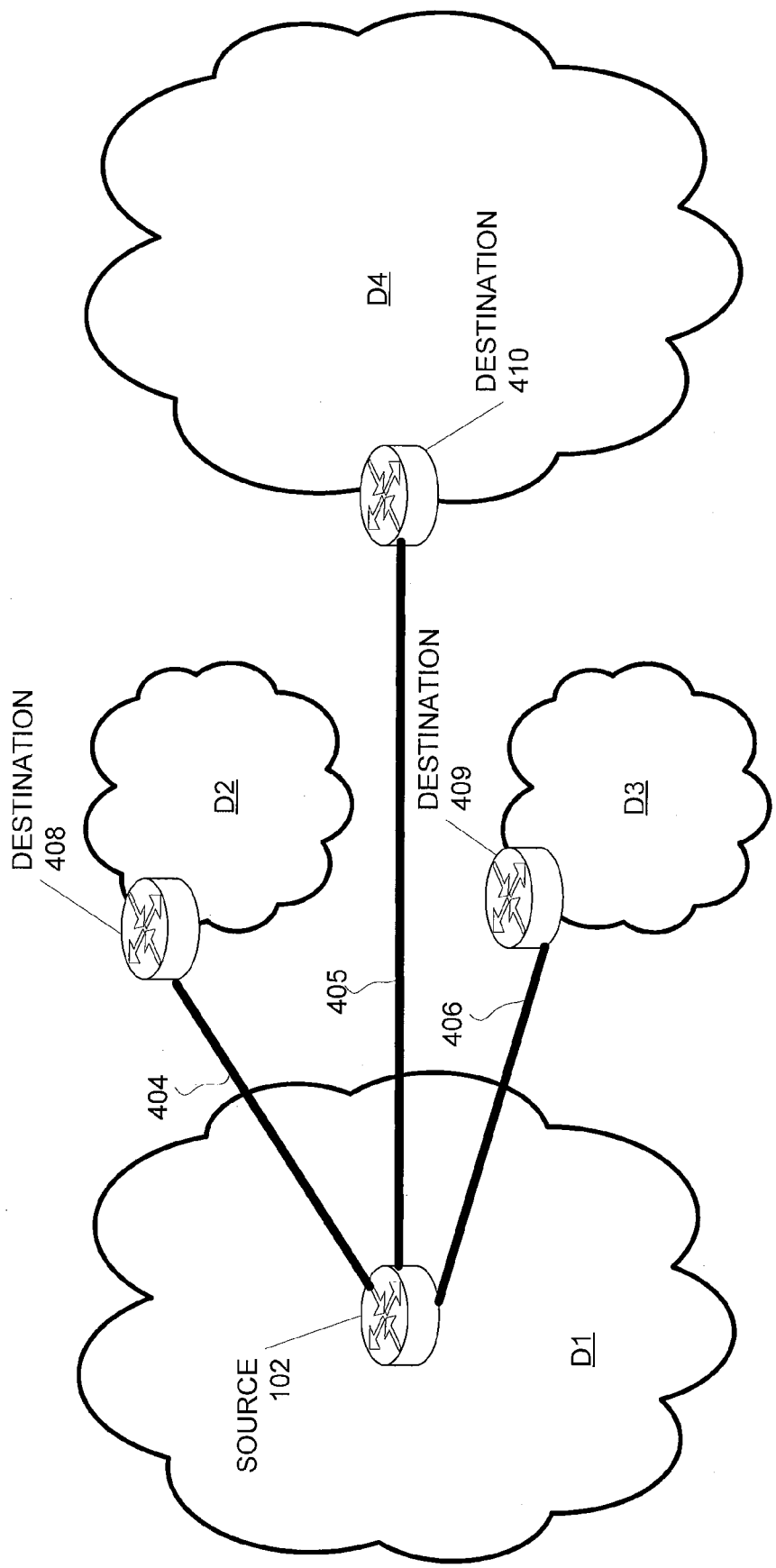
FIG. 4 is a simplified diagram of a multicast control tree, in accordance with an example embodiment.

FIG. 4 is a simplified diagram of a multicast control tree, in accordance with an example embodiment. The multicast control tree defines destination label switch routers 408-410 and paths 404-406 from source label switch router 102 to the destination label switch routers. It should be noted that paths 404-406 may traverse a variety of domains by way of border routers, but such domains and border routers are omitted in FIG. 4 to more clearly illustrate a multicast control tree. Unlike the multicast data tree, each destination label switch router 408, 409 or 410 defined in a multicast control tree is associated with a different domain D2, D3 or D4, respectively. For example, as shown in FIG. 4, each destination label switch router 408, 409 or 410 is associated with one unique domain D2, D3 or D4.

Since each label switch router 408, 409 or 410 maps to a different domain, the multicast control tree in effect defines a number of domains D2-D4. In an example embodiment, domains D2-D4 may be predefined. For example, a user may define domains D2-D4. To define domains D2-D4 in a multicast control tree, a user may define or specify a label switch router (e.g., a border label switch router 408, 409 or 410) for each domain. Alternatively, the user may provide a list of domains, such as domains D2-D4, and source label switch router 102 can automatically find and populate the multicast control tree with one or more destination label switch routers, such as border routers 408-410, associated with each listed domain. It should be noted that a list is a series of domains. In an example, the domains may be listed in a data structure (e.g., a file, a table, an array, and other data structures).

Figure 5:
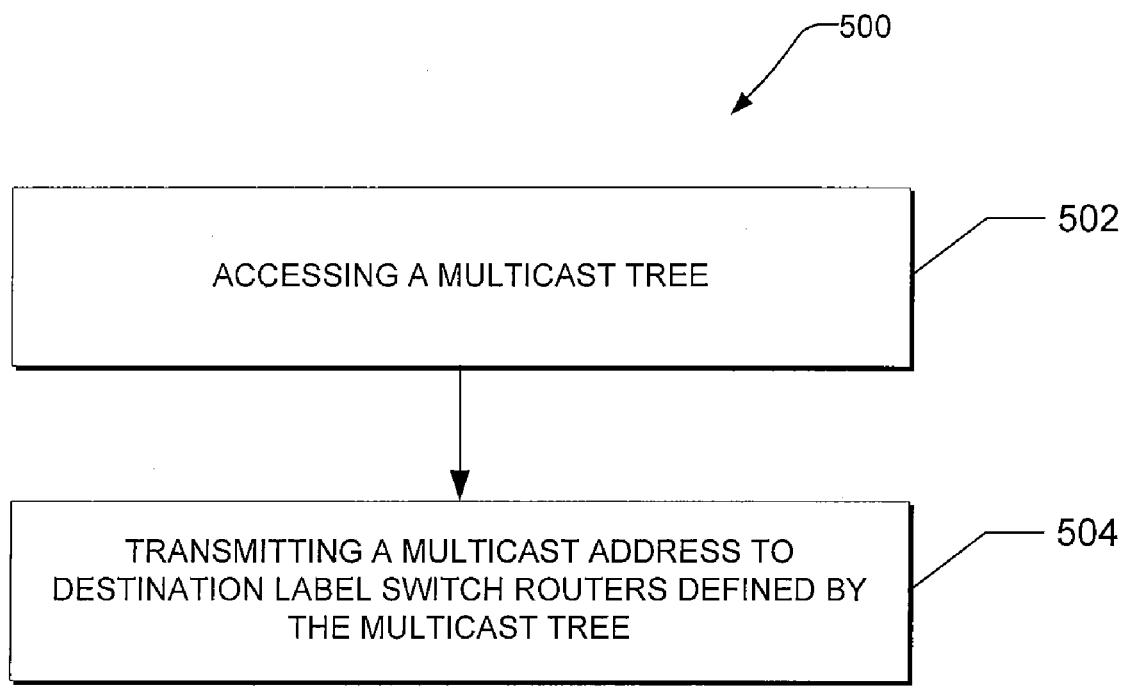
FIG. 5 is a flow diagram of a general overview of a method, in accordance with an example embodiment, for transmitting multicast addresses.

FIG. 5 is a flow diagram of a general overview of a method, in accordance with an example embodiment, for transmitting multicast addresses. In an example embodiment, method 500 may be implemented by path computation module 212 of FIG. 2, employed in an apparatus, such as source label switch router 102 of FIG. 1. As shown in FIG. 5, in an example embodiment, a source label switch router accesses a multicast tree at 502. Access may include, for example, locating and loading a multicast tree. In an example embodiment, the multicast tree is a multicast data tree. In another example embodiment, the multicast tree is a multicast control tree. The selection of the type of multicast tree (e.g., multicast control tree or multicast data tree) may depend on the type of multicast tree accessible by a source label switch router. For example, if the source label switch router stores a multicast data tree but not a multicast control tree, then the source label switch router accesses a multicast data tree. On the other hand, if the source label switch router stores a multicast control tree but not a multicast data tree, then the source label switch router accesses a multicast control tree. If the source label switch router stores both the multicast data tree and the multicast control tree, then the type of multicast tree selected may depend on the type of operation requested by the source label switch router. In an example embodiment, the source label switch router accesses a multicast control tree for discovering new label switch routers, as explained in more detail below. For other operations, such as deleting an existing destination label switch router, the source label switch router accesses a multicast data tree.

At 504, after the multicast tree is accessed, a source label switch router may dynamically update the multicast tree by initially transmitting a multicast address to the destination label switch routers. Here, one or more multicast addresses (e.g. a set of multicast addresses) associated with a multicast group are transmitted to the destination label switch routers defined by the multicast tree. Transmission may be made by broadcasting or advertising the multicast address to all the destination switch routers defined by the multicast tree. In general, a multicast address is an identifier for a group of label switch routers that have joined a multicast group. An example of a multicast address is a class D address, which is a type of IP address that falls within a range from 224.0.0.0 to 239.255.255.255. Another example of a multicast address is a globally scoped address, which is a range of addresses from 224.0.1.0 through 238.255.255.255. Other examples of multicast addresses include Ethernet Media Access Control (MAC) addresses, Glop addresses (e.g., 233.0.0.0/8 address range), Layer 2 Multicast Addresses, and other multicast addresses.

Figure 6:
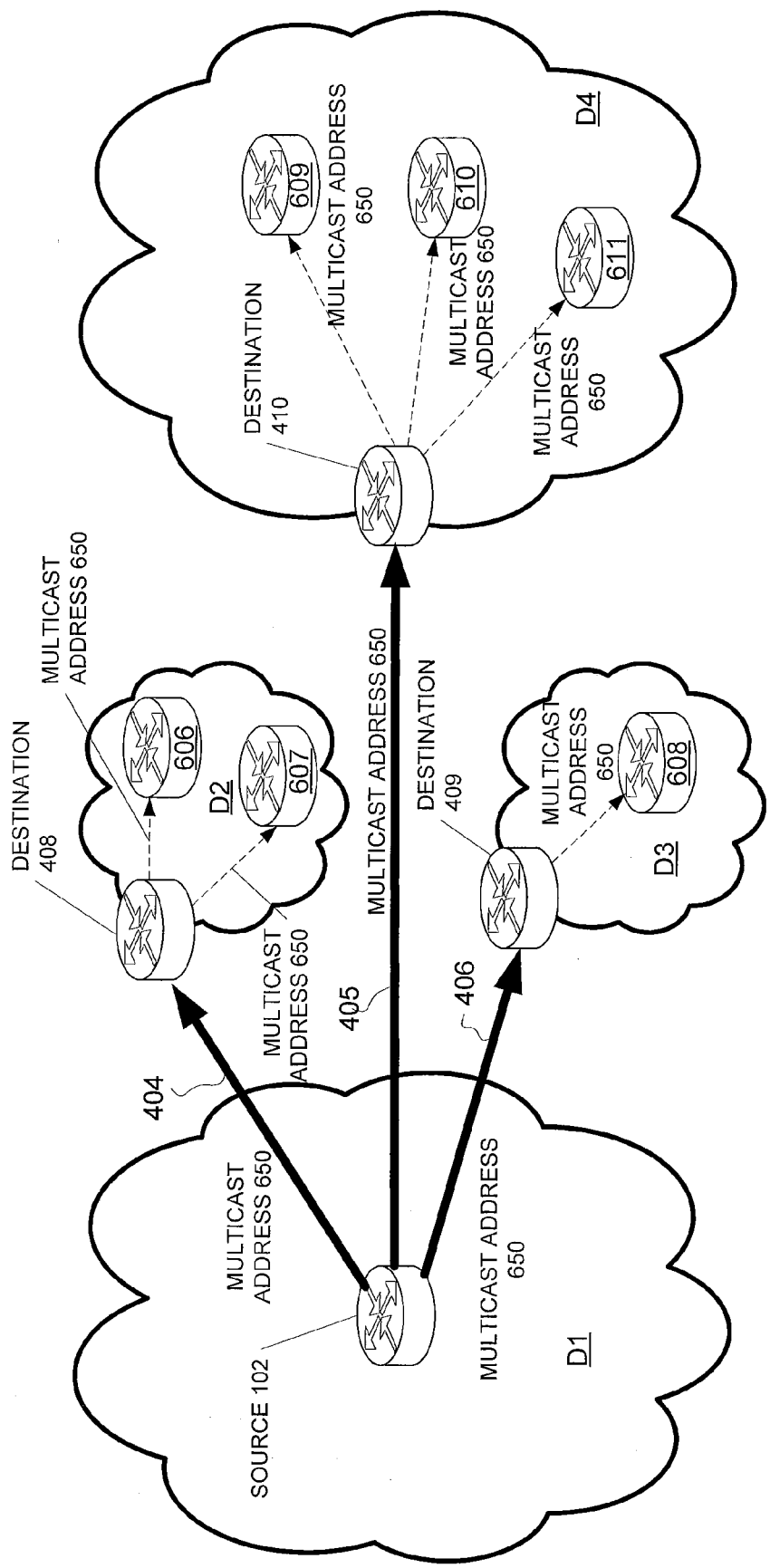
FIG. 6 is a simplified diagram illustrating the transmission of multicast addresses, in accordance with an example embodiment.

FIG. 6 is a simplified diagram illustrating the transmission of multicast addresses, in accordance with an example embodiment. FIG. 6 shows an example of a multicast control tree with source label switch router 102 and destination label switch routers 408-410. Here, each destination label switch router 408, 409 or 410 is a border router associated with a different domain, such as domains D2, D3, and D4, respectively. Source label switch router 102 transmits multicast address 650 to destination label switch routers 408-410 along paths 404-406 defined by the multicast control tree. For example, source label switch router 102 transmits multicast address 650 to destination label switch router 408 along path 404. In another example, source label switch router 102 transmits multicast address 650 to destination label switch router 410 along path 405.

After destination label switch routers 408-410 receive multicast address 650, the destination label switch routers may further transmit or forward the multicast address to other label switch routers 606-611 within their domains D2-D4. Such label switch routers 606-611 are not associated with the multicast control tree. Here, as shown in FIG. 6, destination label switch router 408 may automatically transmit multicast address 650 to other label switch routers 606 and 607 within its domain D2. Similarly, destination label switch router 410 may automatically transmit multicast address 650 to other label switch routers 609-611 within its domain D4. Destination label switch router 409 may automatically transmit multicast address 650 to another label switch router 608 within its domain D3.

Each destination label switch router 408, 409 or 410 may transmit multicast address 650 by way of an interior gateway protocol. An interior gateway protocol refers to one or more routing protocols that are used within a domain, such as domains D1-D4. Examples of interior gateway protocols include Open Shortest Path First (OSPF), Intermediate-System-to-Intermediate-System (IS-IS), and other interior gateway protocols. Multicast address 650 may be included in an interior gateway protocol advertisement. Transmission may, for example, be by way of an interior gateway protocol flooding mechanism where destination label switch router 408, 409 or 410 broadcasts or advertises multicast address 650 to all label switch routers, such as label switch routers 606 and 607, within its domain D2, D3 or D4, respectively. By having destination label switch routers 408-410 broadcast multicast address 650 to label switch routers 609-611 within their domains D2-D4, the multicast address may be transmitted to the label switch routers that are not associated with the multicast control tree. It should be appreciated that the transmission techniques described above may also be applied to a multicast data tree.

Figure 7:
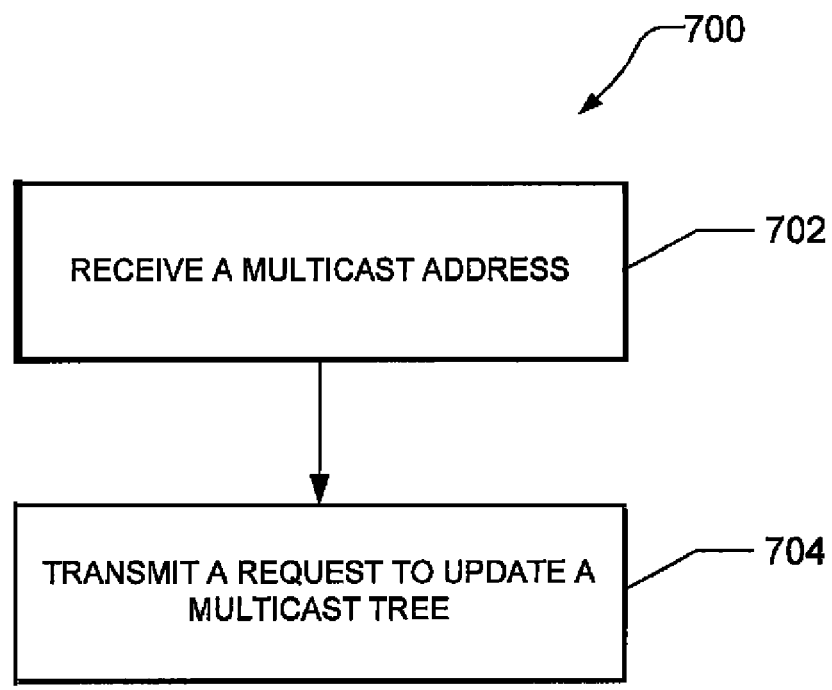
FIG. 7 is a flow diagram of a general overview of a method, in accordance with an example embodiment, for updating a multicast tree.

FIG. 7 is a flow diagram of a general overview of a method, in accordance with an example embodiment, for updating a multicast tree. In an example embodiment, method 700 may be implemented by a label switch router, such as label switch routers 408-410 and 606-611 of FIG. 6. As shown in FIG. 7, a label switch router receives one or more multicast addresses at 702. Based on the received multicast addresses, the label switch router may transmit a request to update a multicast tree at 704. It should be appreciated that label switch routers that want to receive a particular data stream from a multicast group need to join the multicast group. If the label switch router is a member of the multicast group, then the label switch router may receive the data stream. As explained in more detail below, the request to update may include a request to join the multicast group associated with the received multicast address. On the other hand, if the label switch router that is part of a multicast group does not want to receive the particular data stream to the multicast group, then the label switch router may want to be removed from the multicast group. Here, as explained in more detail below, the request to update may include a request to leave the multicast group associated with the received multicast address.

Figure 8:
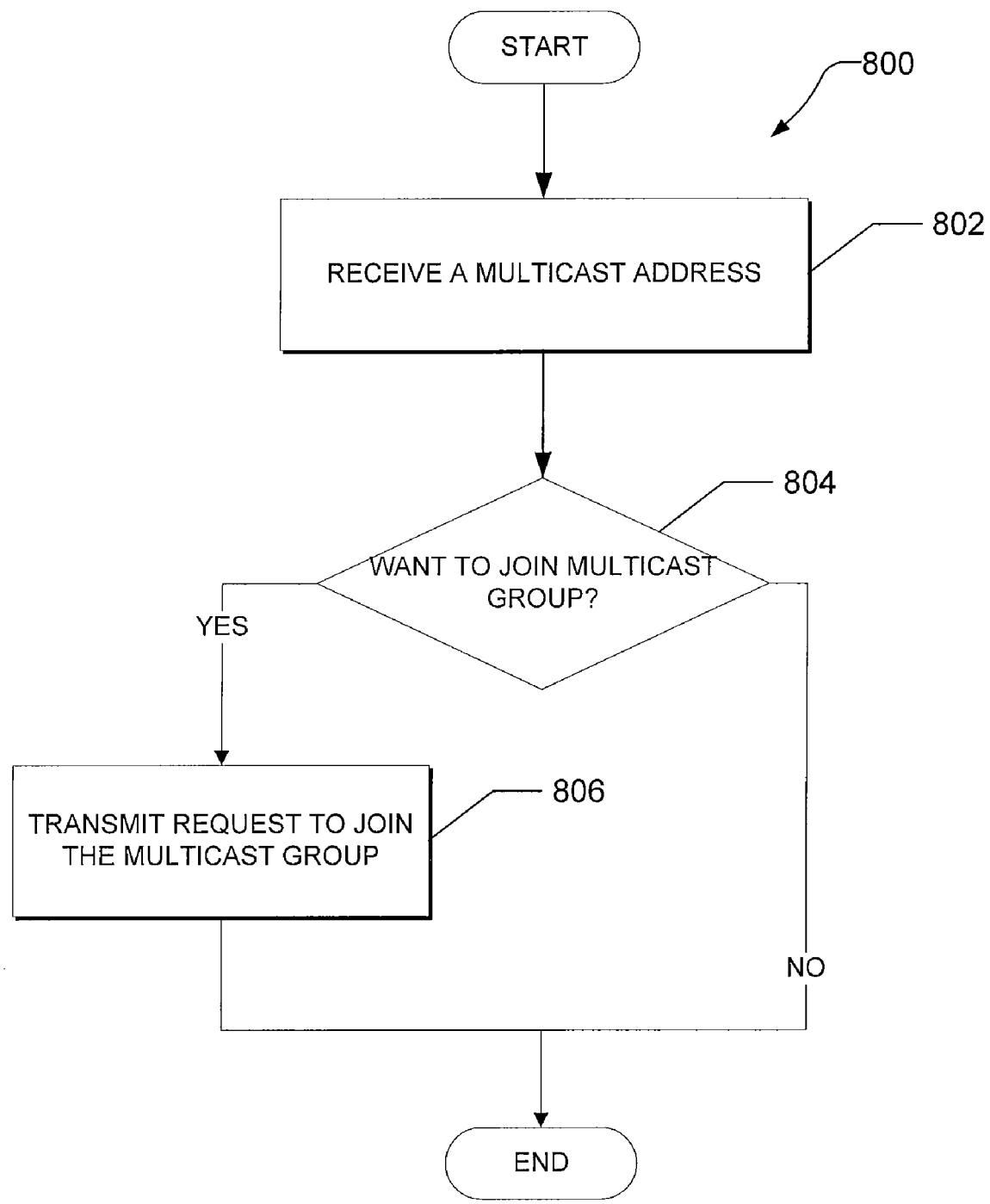
FIG. 8 is a flow diagram of a general overview of a method, in accordance with an example embodiment, for discovering and adding a new label switch router to a multicast tree.

FIG. 8 is a flow diagram of a general overview of a method, in accordance with an example embodiment, for discovering and adding a new label switch router to a multicast tree. In an example embodiment, method 800 may be implemented by a label switch router not associated with a multicast tree or multicast group, such as label switch routers 606-611 of FIG. 6. As shown in FIG. 8, a label switch router receives a multicast address at 802. If the label switch router wants to join a multicast group, the label switch router makes a determination at 804 as to whether it wants to join the multicast group associated with the multicast address. In an example embodiment, the label switch router can make the determination based on the received multicast address. Here, the label switch router compares the received multicast address with a multicast address associated with a particular data stream that the label switch router wants to receive. If the received multicast address matches the multicast address of the particular data stream, then the label switch router wants to join the multicast group associated with the received multicast address. On the other hand, if the received multicast address does not match the multicast address of the particular data stream that the label switch router wants to receive, then the label switch router does not want to join the multicast group associated with the received multicast address.

If the label switch router wants to join the multicast group, then the label switch router transmits a request at 806 to join the multicast group. In an example, the request to join may be an expand message embodied as a Path Computation Element Communication Protocol (PCEP) message, which is a communication protocol used between PCE and PCC. The request to join includes an identifier of the label switch router that originated the request to join. For example, the request to join may include an identifier of a new label switch router. The identifier may include a variety of identifiers associated with a label switch router. An example of an identifier may include a router ID.

Depending on the type of path computation used, the request to join may or may not be transmitted to a source label switch router. In an example embodiment, the label switch router transmits the request to join to a source label switch router by way of one or more destination label switch routers associated with the multicast tree. For example, since the label switch router is not associated with a multicast tree, the label switch router may transmit the request to a destination label switch router associated with the multicast tree within the same domain by way of an interior gateway protocol. The destination label switch router may then transmit the request to the source label switch router by way of paths defined by the multicast tree. In another example embodiment, the label switch router may transmit the request to a destination label switch router within the same domain by way of an interior gateway protocol. The destination label switch router may include a path computation module that computes a path to the new label switch router and forwards the computed path to the source label switch router.

Figure 9A:
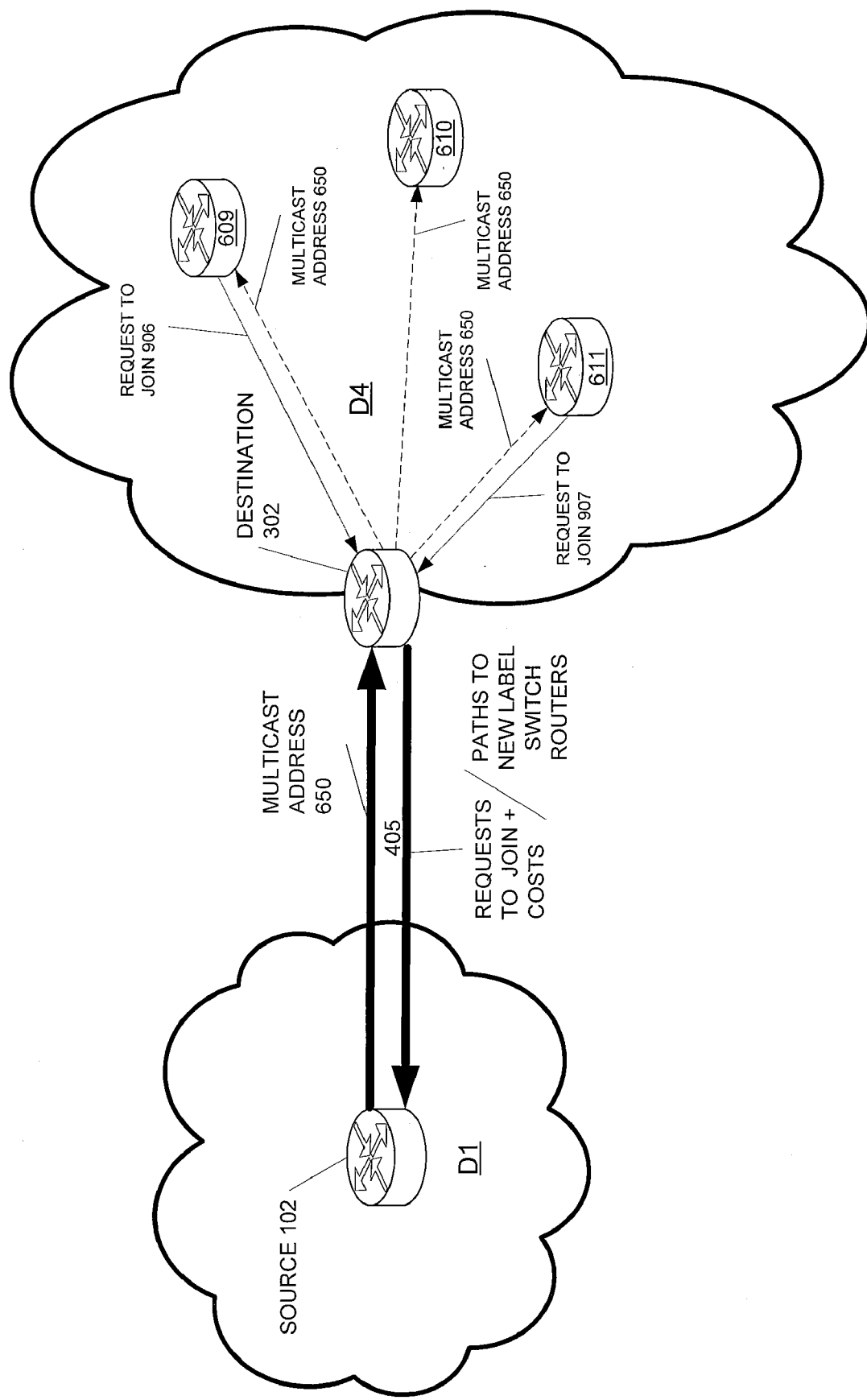
FIGS. 9A and 9B are simplified diagrams illustrating the discovery and addition of a new label switch router, in accordance with an example embodiment.
Figure 9B:
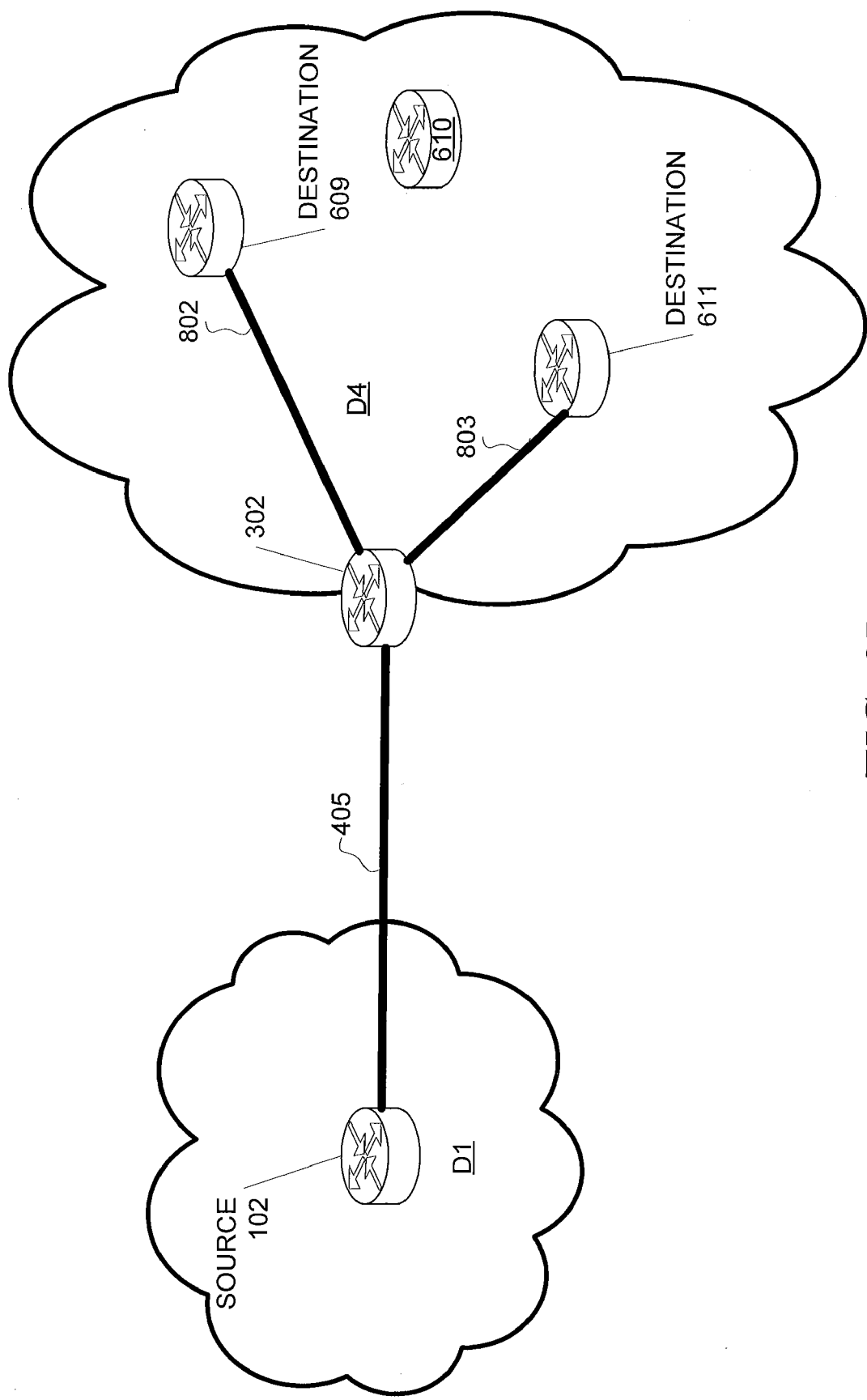

FIGS. 9A and 9B are simplified diagrams illustrating the discovery and addition of a new label switch router, in accordance with an example embodiment. As shown in FIG. 9A, multicast tree defines destination label switch router 302 and path 405 from source label switch router 102 to the destination label switch router. Source label switch router 102 is associated with domain D1 and destination label switch router 302 is associated with domain D4. In an embodiment, the multicast tree may be a multicast data tree. In another embodiment, the multicast tree may be a multicast control tree.

In addition to destination label switch router 302, domain D4 includes label switch routers 609-611 that are not associated with the multicast tree or multicast group. As a result, label switch routers 609-611 do not receive a particular data stream to destination label switch router 302 associated with the multicast tree. To discover new label switch routers 609-611 not associated with the multicast tree that want to receive the data stream, source label switch router 102 initially transmits multicast address 650 to destination label switch router 302 by way of path 405. Destination label switch router 302 receives multicast address 650 and transmits (e.g., advertises or broadcasts) the multicast address to label switch routers 609-611 within its domain D4. Since the multicast tree does not define paths to label switch routers 609-611, destination switch router 302 transmits multicast address 650 to the label switch routers by way of an interior gateway protocol.

After receiving multicast address 650, each label switch router 609, 610 or 611 makes a determination as to whether it wants to join the multicast group associated with the multicast address. In FIG. 9A, both label switch routers 609 and 611 want to join the multicast group. On the other hand, label switch router 610 does not want to join the multicast group.

As a result, label switch routers 609 and 611 transmit requests to join 906 and 907 to destination label switch router 302 by way of interior gateway protocol. Each request to join 906 or 907 includes an identifier of label switch router 609 or 611 that originated the request to join. For example, request to join 906 includes an identifier of label switch router 609 that transmitted the request to join.

Still referring to FIG. 9A, destination label switch router 302 receives requests to join 906 and 907 and computes a cost from the destination label switch router to each label switch router 609 or 611. A cost is the price of transmission of data between a label switch router, such as label switch router 609 or 611, and another label switch router, such as destination label switch router 302. Cost may be based on, for example, metric from destination label switch router 302 to label switch router 609 or 611, number of interconnected label switch routers, traffic congestion, and other factors. In an embodiment, destination label switch router 302 may then transmit the costs along with the requests to join 906 and 907 to source label switch router 102. Depending on the type of path computational technique used, the costs and requests to join 906 and 907 may not be forwarded to source label switch router 102. In this embodiment, instead of transmitting the costs and requests to join 906 and 907 to source label switch router 102, destination label switch router 302 may compute paths to label switch routers 609 and 611 based on the costs and forward the paths to source label switch router 102.

FIG. 9B is a simplified diagram of the addition of new label switch routers to the multicast tree, in accordance with an example embodiment. Source label switch router 102 may receive requests from label switch routers 609 and 611 to join the multicast group associated with the multicast address. In addition, source label switch router 102 may receive costs from label switch router 302 associated with the transmission of data between label switch router 302 and label switch routers 609 and 611. In response to the request, source label switch router 102 adds new label switch routers 609 and 611 to the multicast tree. As a result, new label switch routers 609 and 611 become the destination label switch routers of the multicast tree. In an embodiment, source label switch router 102 may compute paths 405, 802, and 803 to each new label switch router 609 or 611 based on the cost associated with each new label switch router. As discussed above, source label switch router 102 may use a variety of path computational techniques, such as CPSF, P2MP computation, and other path computational techniques. FIG. 9B shows expanded multicast tree with added destination label switch routers 609 and 611 and paths 405, 802, and 803 to the destination label switch routers.

Figure 10:
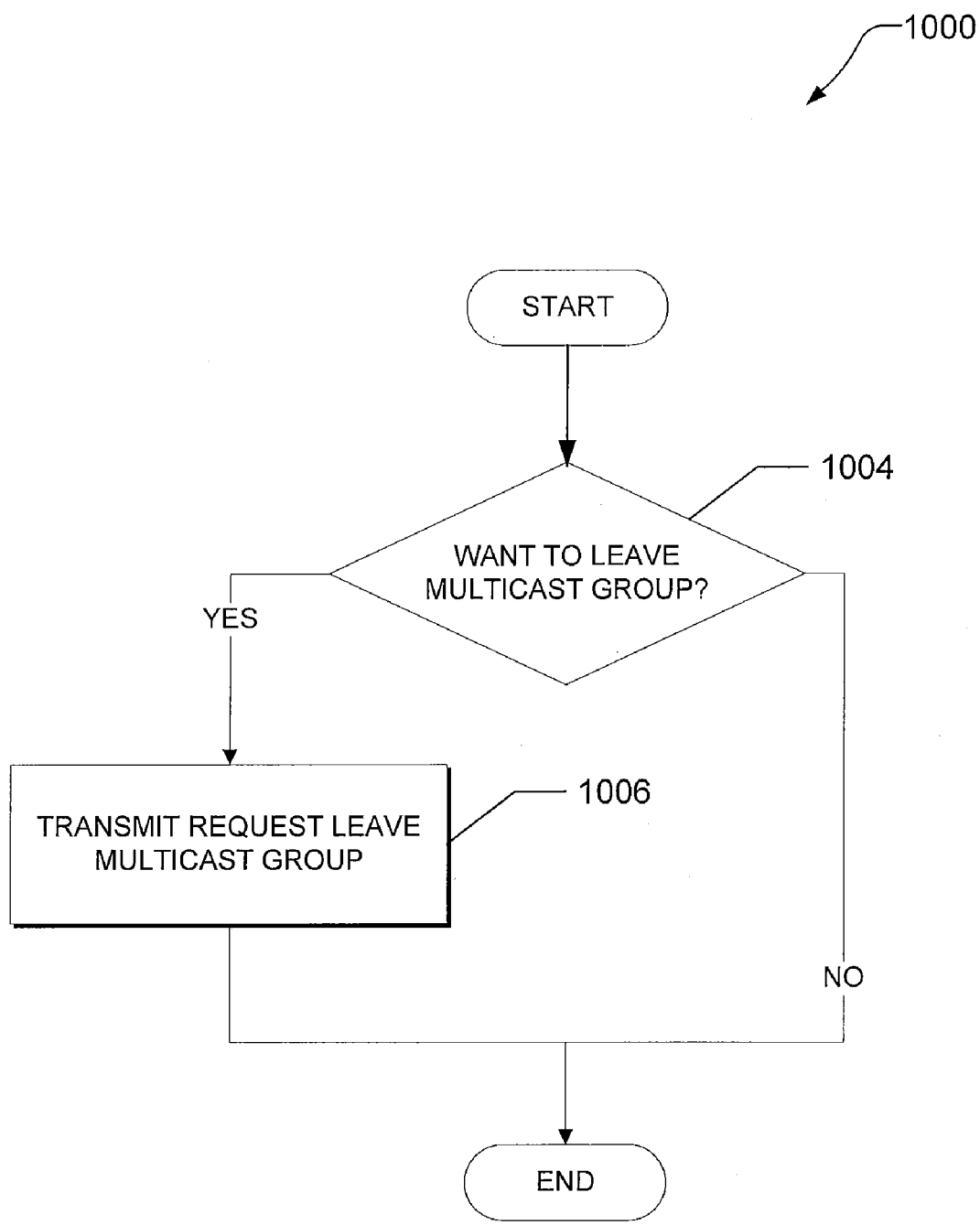
FIG. 10 is a flow diagram of a general overview of a method, in accordance with an example embodiment, for deleting a destination label switch router from a multicast tree.

FIG. 10 is a flow diagram of a general overview of a method, in accordance with an example embodiment, for deleting a destination label switch router from a multicast tree. In an example embodiment, method 1000 may be implemented by a destination label switch router associated with a multicast group, such as destination label switch routers 609-611 of FIG. 9B. As shown in FIG. 10, a destination label switch router makes a determination at 1004 as to whether it wants to leave the multicast group. In an example embodiment, the destination label switch router can make the determination based on the multicast address associated with the multicast group. Here, the destination label switch router compares the multicast address with a multicast address associated with a particular data stream that the destination label switch router does not want to receive. If the received multicast address matches the multicast address of the particular data stream, then the destination label switch router wants to leave the multicast group associated with the received multicast address. On the other hand, if the received multicast address does not match the multicast address of the particular data stream that the label switch router wants to receive, then the destination label switch router wants to remain with the multicast group associated with the received multicast address.

If the destination label switch router wants to leave the multicast tree, then the destination label switch router transmits a request at 1006 to leave the multicast group. In an example, the request to leave may be a prune message embodied as a PCEP message, which is a communication protocol used between PCE and PCC. The request to leave includes an identifier of the destination label switch router that originated the request to leave.

Figure 11A:
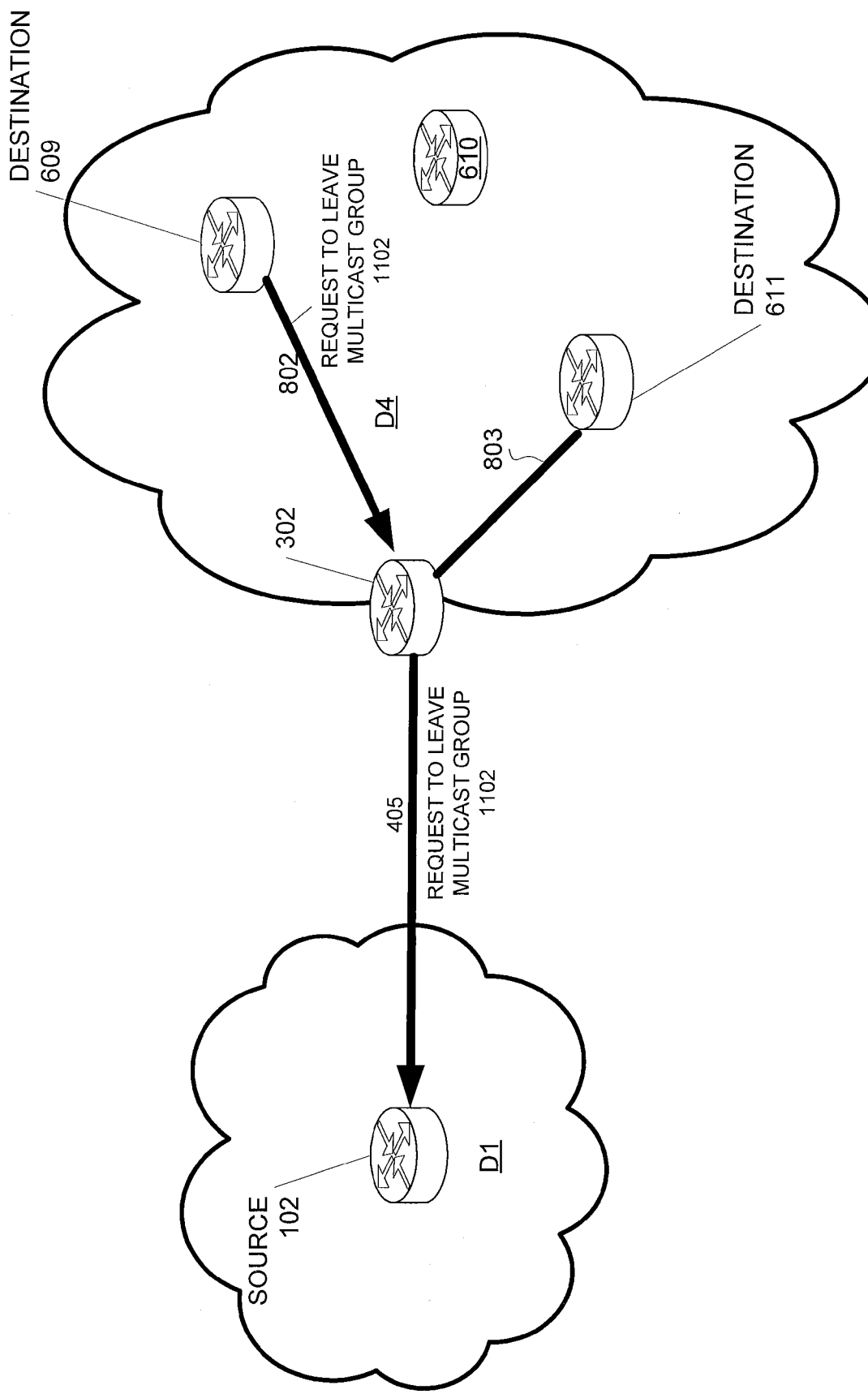
FIGS. 11A and 11B are simplified diagrams illustrating the deletion or removal of a destination label switch router, in accordance with an example embodiment.
Figure 11B:
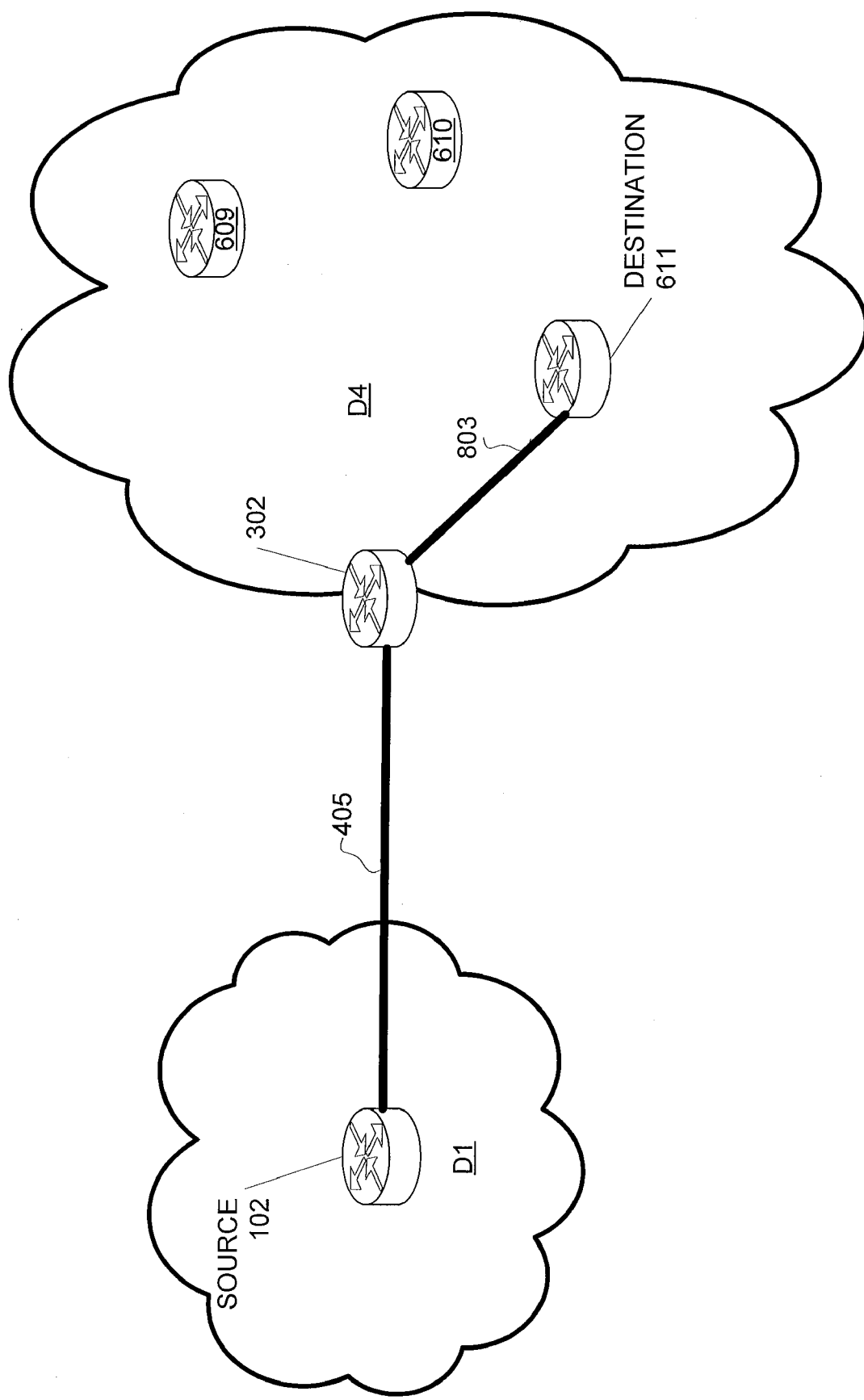

FIGS. 11A and 11B are simplified diagrams illustrating the deletion or removal of a destination label switch router, in accordance with an example embodiment. As shown in FIG. 11A, the multicast tree defines destination label switch routers 609 and 611 and paths 405, 802 and 803 from source label switch router 102 to the destination label switch routers. In an embodiment, the multicast tree may be a multicast data tree. In another embodiment, the multicast tree may be a multicast control tree. Source label switch router 102 is associated with domain D1 and destination label switch routers 609 and 611 are associated with domain D4. Each destination label switch router 609, 610 or 611 makes a determination as to whether it wants to leave the multicast group associated with the multicast address. In FIG. 11A, destination label switch router 609 wants to leave the multicast tree. On the other hand, destination label switch router 611 wants to remain with the multicast tree. As a result, destination label switch router 609 transmits request to leave 1102 to label switch router 302 by way of path 802. In this example, request to leave 1102 includes an identifier of destination label switch router 609 that originated the request to leave. In an embodiment, label switch router 302 may then transmit request to leave 1102 to source label switch router 102. In another embodiment, instead of forwarding or transmitting request to leave 1102 to source label switch router 102, label switch router 302 may recompute paths to exclude path 802 and forward the recomputed paths (e.g., 803) to source label switch router 102.

FIG. 11B is a simplified diagram of the deletion of a destination label switch router from the multicast tree, in accordance with an example embodiment. Source label switch router 102 may receive from destination label switch router 609 a request to leave the multicast group associated with the multicast address. In response to the request, source label switch router 102 deletes destination label switch router 609 and path to the destination label switch router from the multicast tree. As such, the resulting pruned multicast tree defines destination label switch router 611 and paths 405 and 803 from source label switch router 102 to the destination label switch router.

Figure 12:
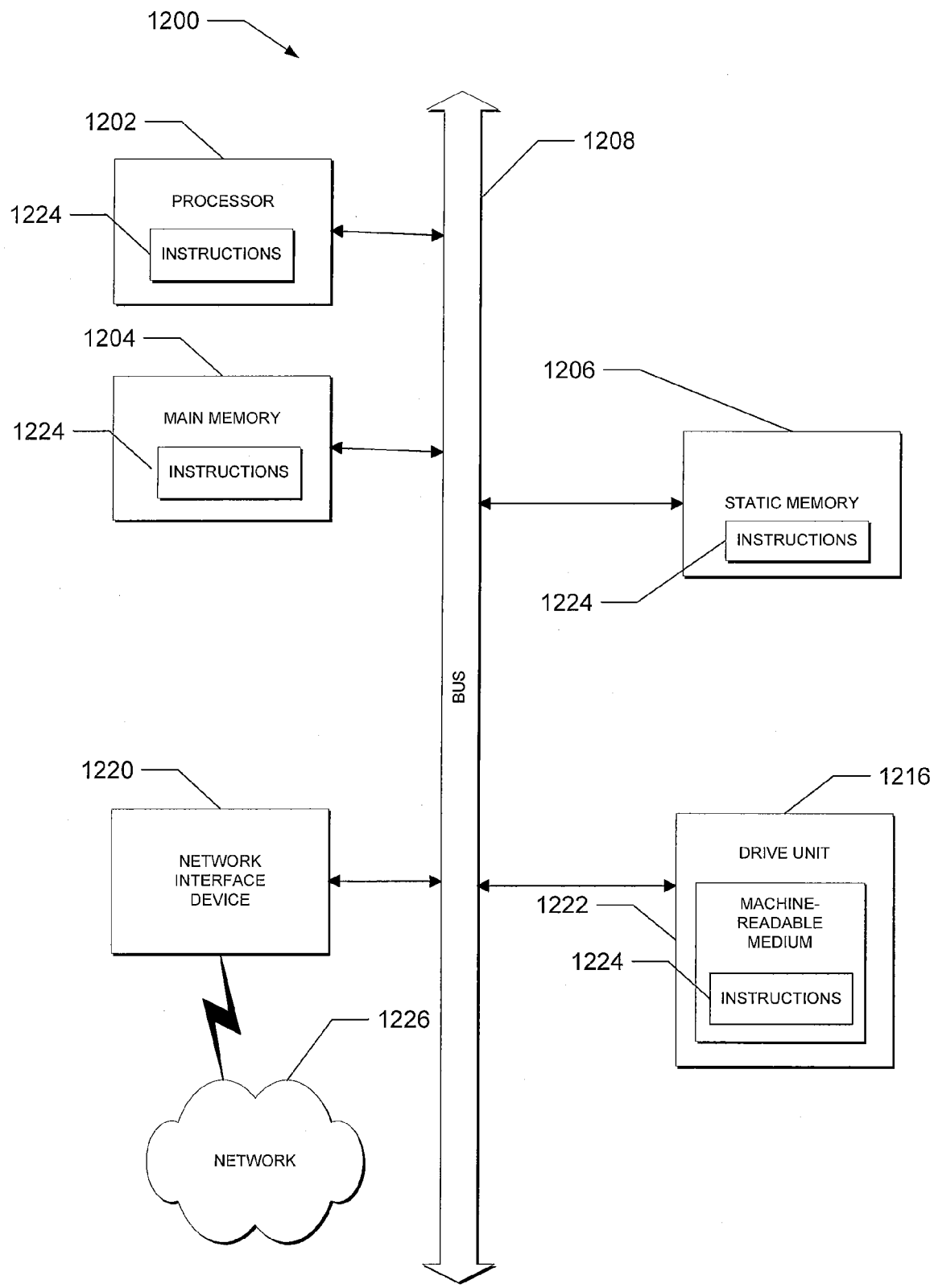
FIG. 12 is a simplified block diagram of a machine in the example form of a computing system, in accordance with an example embodiment.

FIG. 12 is a simplified block diagram of a machine in the example form of a computing system within which a set of instructions, for causing the machine to perform any one or more of the methodologies discussed herein, may be executed. In alternative embodiments, the machine may be connected (e.g., networked) to other machines. The machine may be a network router (e.g., label switch router), switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 1200 includes processor 1202 (e.g., a central processing unit (CPU)), main memory 1204 and static memory 1206, which communicate with each other via bus 1208. Computing system 1200 may also include disk drive unit 1216 and network interface device 1220.

Disk drive unit 1216 includes machine-readable medium 1222 on which is stored one or more sets of instructions and data structures (e.g., software 1224) embodying or utilized by any one or more of the methodologies or functions described herein. Software 1224 may also reside, completely or at least partially, within main memory 1204 and/or within processor 1202 during execution thereof by computing system 1200, with main memory 1204 and processor 1202 also constituting machine-readable, tangible media. Software 1224 may further be transmitted or received over network 1226 via network interface device 1220 utilizing any one of a number of well-known transfer protocols (e.g., Hypertext Transfer Protocol (HTTP)).

While machine-readable medium 1222 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an example embodiment has been described with reference to specific example embodiments, it will be evident that various modifications and changes may be made to these example embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   selecting a type of multicast tree that defines a destination label switch router and a path from a source label switch router to the destination label switch router, the type of multicast tree selected being one of a multicast data tree or a multicast control tree, the selection based on a type of operation requested by the source label switch router, the type of operation being one of adding a new label switch router to the multicast tree or deleting the destination label switch router from the multicast tree, the multicast control tree defining a plurality of destination label switch routers, each of the plurality of destination label switch routers defined in the multicast control tree being associated with a different domain, the multicast data tree defining a plurality of destination label switch routers, each of the plurality of destination label switch routers defined in the multicast data tree being associated with a domain; and
   transmitting a multicast address to the destination label switch router.

2. The method of claim 1, further comprising:
   receiving a request to join a multicast group associated with the multicast address, the request including an identifier of a new label switch router; and
   adding the new label switch router to the multicast tree.

3. The method of claim 2, further comprising:
   receiving a cost associated with a transmission of data between the destination label switch router and the new label switch router; and
   computing a path to the new label switch router based on the cost.

4. The method of claim 1, further comprising:
   receiving a request to leave a multicast group associated with the multicast address, the request including an identifier of the destination label switch router; and
   deleting the destination label switch router from the multicast tree.

5. The method of claim 1, wherein the different domain is from a list of a plurality of predefined domains.

6. An apparatus comprising:
   a processor; and
   a memory in communication with the processor, the memory comprising instructions executable by the processor, when executed the processor being operable to:
      select a type of multicast tree that defines a plurality of destination label switch routers and a plurality of paths from a source label switch router to the plurality of destination label switch routers, the type of multicast tree selected being one of a multicast data tree or a multicast control tree, the selection based on a type of operation requested by the source label switch router, the type of operation being one of adding a new label switch router to the multicast tree or deleting one of the plurality of destination label switch routers from the multicast tree, the multicast control tree defining a plurality of destination label switch routers, each of the plurality of destination label switch routers defined in the multicast control tree being associated with a different domain, the multicast data tree defining a plurality of destination label switch routers, each of the plurality of destination label switch routers defined in the multicast data tree being associated with a domain; and
      transmit a multicast address to the plurality of destination label switch routers.

7. The apparatus of claim 6, wherein when executed the processor being further operable to:
   receive a request to join a multicast group associated with the multicast address, the request including an identifier of a new label switch router; and
   add the new label switch router to the multicast tree.

8. The apparatus of claim 7, wherein when executed the processor being further operable to:

receive a cost associated with a transmission of data between a destination label switch router from the plurality of destination label switch routers and the new label switch router; and compute a path to the new label switch router based on the cost.

9. The apparatus of claim 6, wherein when executed the processor being further operable to:

receive a request to leave a multicast group associated with the multicast address, the request including an identifier of a destination label switch router from the plurality of destination label switch routers; and delete the destination label switch router from the multicast tree.

10. The apparatus of claim 6, wherein the different domain is from a list of a plurality of predefined domains.

11. An apparatus comprising:

a first means for selecting a type of multicast tree that defines a destination label switch router and a path from a source label switch router to the destination label switch router, the type of multicast tree selected being one of a multicast data tree or a multicast control tree, the selection based on a type of operation requested by the source label switch router, the type of operation being one of adding a new label switch router to the multicast tree or deleting the destination label switch router from the multicast tree, the multicast control tree defining a plurality of destination label switch routers, each of the plurality of destination label switch routers defined in the multicast control tree being associated with a different domain, the multicast data tree defining a plurality of destination label switch routers, each of the plurality of destination label switch routers defined in the multicast data tree being associated with a domain; and a second means for transmitting a multicast address to the destination label switch router.

* * * * *